US010445357B2

(12) United States Patent
Morimoto et al.

(10) Patent No.: US 10,445,357 B2
(45) Date of Patent: Oct. 15, 2019

(54) DOCUMENT CLASSIFICATION SYSTEM, DOCUMENT CLASSIFICATION METHOD, AND DOCUMENT CLASSIFICATION PROGRAM

(71) Applicant: FRONTEO, INC., Tokyo (JP)

(72) Inventors: Masahiro Morimoto, Tokyo (JP); Yoshikatsu Shirai, Tokyo (JP); Hideki Takeda, Tokyo (JP); Kazumi Hasuko, Tokyo (JP)

(73) Assignee: FRONTEO, INC., Tokyo (JP)

( * ) Notice: Subject to any disclaimer, the term of this patent is extended or adjusted under 35 U.S.C. 154(b) by 194 days.

(21) Appl. No.: 15/375,035

(22) Filed: Dec. 9, 2016

(65) Prior Publication Data

US 2017/0091321 A1   Mar. 30, 2017

Related U.S. Application Data

(63) Continuation of application No. 14/472,296, filed as application No. PCT/JP2013/055330 on Feb. 28, 2013, now Pat. No. 9,552,570.

(30) Foreign Application Priority Data

Feb. 29, 2012 (JP) .................................. 2012-044382

(51) Int. Cl.
*G06F 16/00* (2019.01)
*G06F 16/35* (2019.01)
(Continued)

(52) U.S. Cl.
CPC .......... *G06F 16/353* (2019.01); *G06F 16/313* (2019.01); *G06F 16/93* (2019.01);
(Continued)

(58) Field of Classification Search
CPC ......... G06F 17/30616; G06F 17/30707; G06F 16/353; G06F 16/313
See application file for complete search history.

(56) References Cited

U.S. PATENT DOCUMENTS 7,769,759 B1   8/2010  Gartung et al.
8,620,918 B1  12/2013  Ben-Artzi et al.
(Continued)

FOREIGN PATENT DOCUMENTS

JP   2003-16106   1/2003
JP   2009-98811   5/2009
(Continued)

OTHER PUBLICATIONS

International Search Report dated Apr. 2, 2013 in corresponding International Application No. PCT/JP2013/055330, (3 pages).
(Continued)

*Primary Examiner* — Grace Park
(74) *Attorney, Agent, or Firm* — Brundidge & Stanger, P.C.

(57) ABSTRACT

A document classification system is provided. The document classification system analyzes digital document information which is collected to be submitted as evidence in a lawsuit and classifies the digital document information. The document classification system includes an extraction unit that extracts documents from the collected document information, a document display unit that displays an extracted document group, a classification code receiving unit that receives a classification code assigned to the displayed document group, a selection unit that classifies the extracted document group for each classification code, analyzes a keyword commonly appearing in the classified document group, and selects the keyword, a database that records the selected keyword, a search unit that searches for the keyword from the document information, a score calculation (Continued)

unit that calculates a score indicating connection between the classification code and the document, and an automatic classification unit that automatically assigns the classification code.

10 Claims, 17 Drawing Sheets

(51) Int. Cl.
*G06F 16/93* (2019.01)
*G06F 16/31* (2019.01)
*G06Q 50/18* (2012.01)
*G06Q 10/10* (2012.01)
*G06N 5/02* (2006.01)

(52) U.S. Cl.
CPC ............... *G06N 5/02* (2013.01); *G06Q 10/10* (2013.01); *G06Q 50/18* (2013.01)

(56) References Cited

U.S. PATENT DOCUMENTS

| | | |
|---|---|---|
| 2002/0152051 A1 | 10/2002 | Fukushige et al. |
| 2007/0198594 A1 | 8/2007 | Lunt et al. |
| 2009/0300007 A1 | 12/2009 | Hiraoka |
| 2010/0205020 A1 | 8/2010 | Losey |
| 2010/0332428 A1 | 12/2010 | McHenry et al. |
| 2011/0137921 A1 | 6/2011 | Inagaki |
| 2012/0239666 A1 | 9/2012 | Morimoto et al. |

FOREIGN PATENT DOCUMENTS

| | | |
|---|---|---|
| JP | 2011-008312 | 1/2011 |
| JP | 2011-170786 | 9/2011 |
| JP | 2011-209930 | 10/2011 |
| JP | 2011-209931 | 10/2011 |
| JP | 2012-32859 | 2/2012 |

OTHER PUBLICATIONS

Decision of Rejection dated Oct. 20, 2015, from Japanese Patent Office in corresponding Japanese Patent Application No. 2015-095261 (3 pages).

First Notification of Office Action dated Sep. 30, 2015, from The State Intellectual Property Office of China in corresponding Chinese application No. 201380011864.7 (6 pages).

Notice of Reasons for Rejection related to Japanese Patent Application No. 2012-044382, dated Apr. 8, 2014, (Japanese and English language translation included; 4 pgs).

EPO Communication issued in EP 13754385.6, dated May 3, 2017, 8 pages.

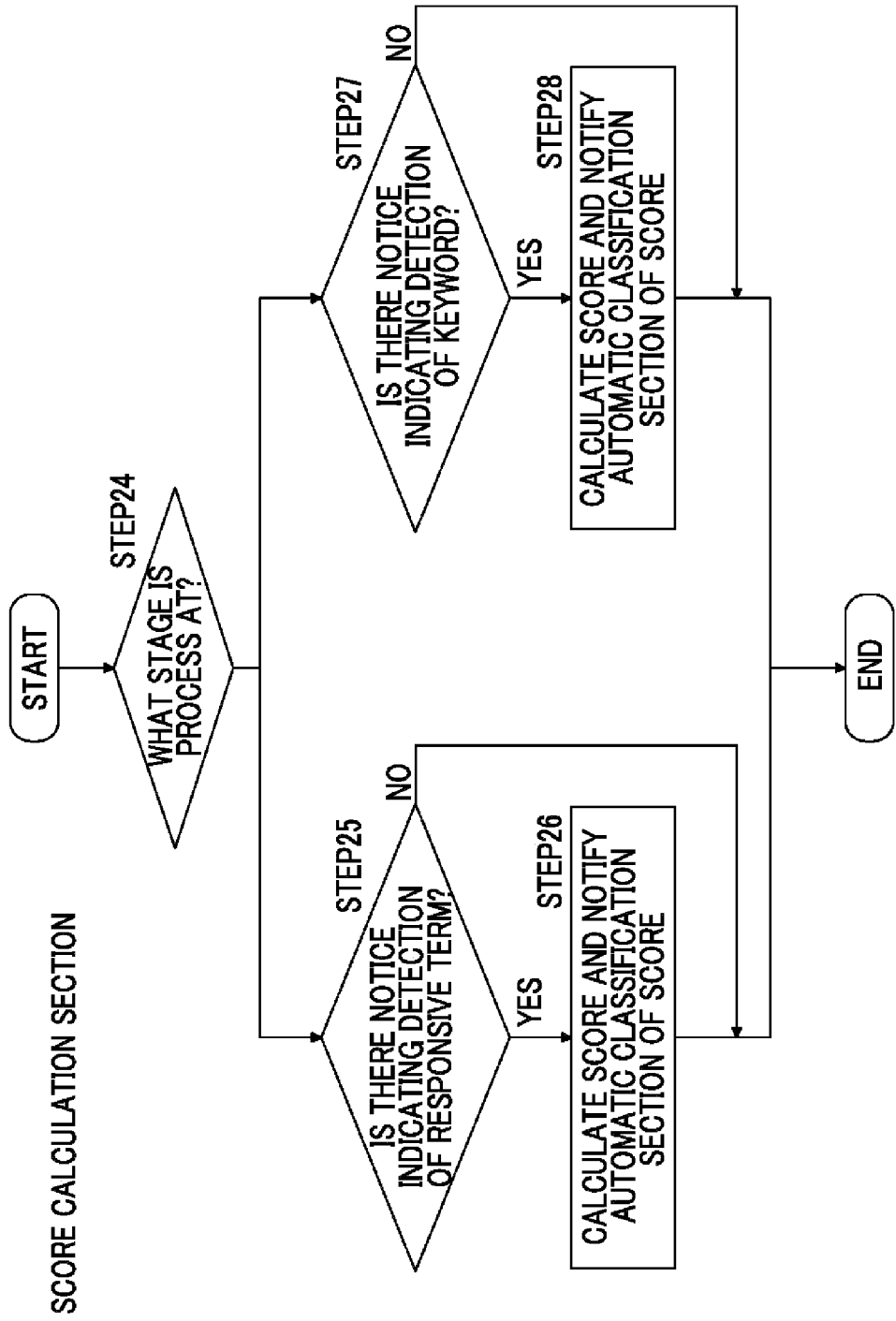

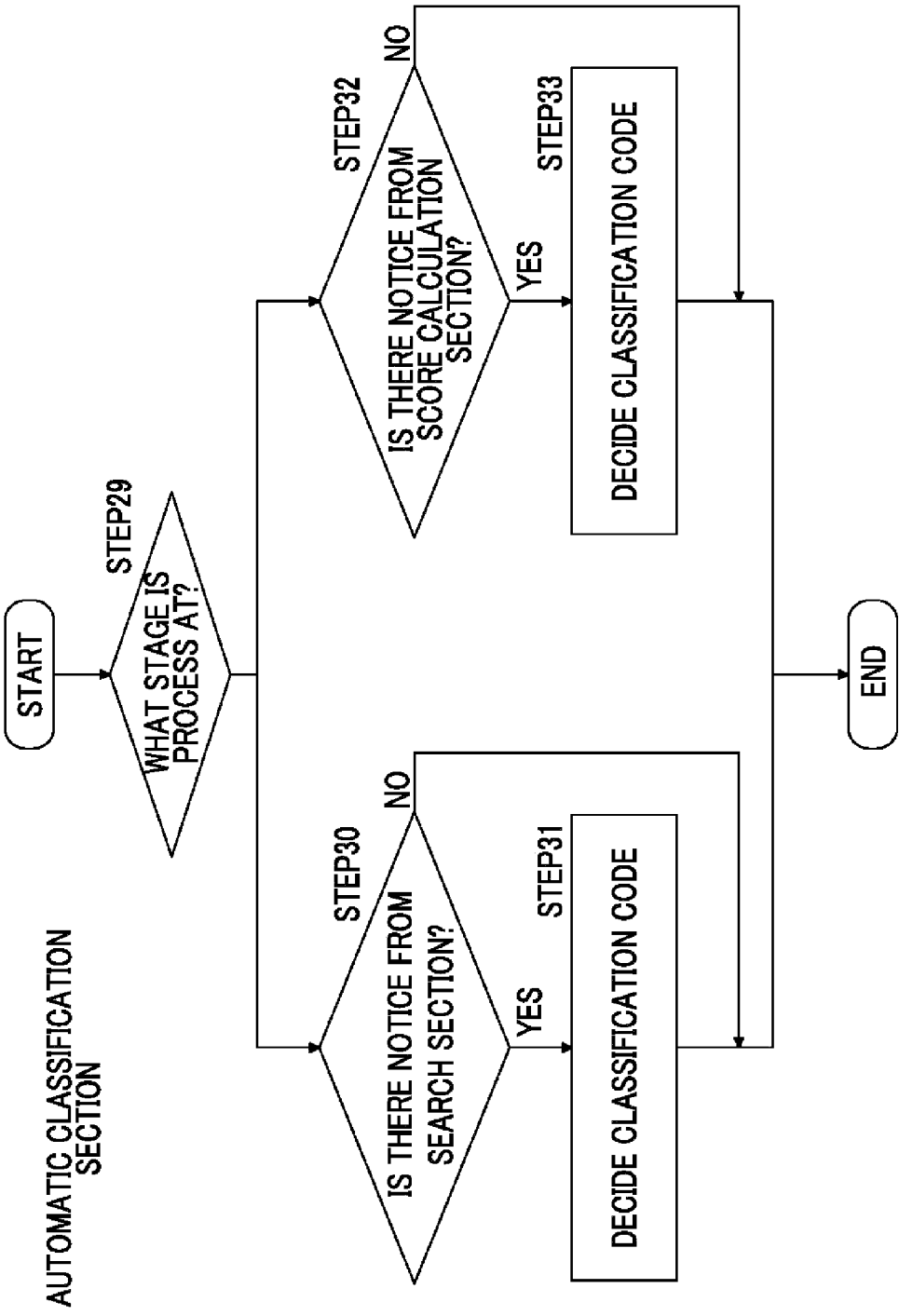

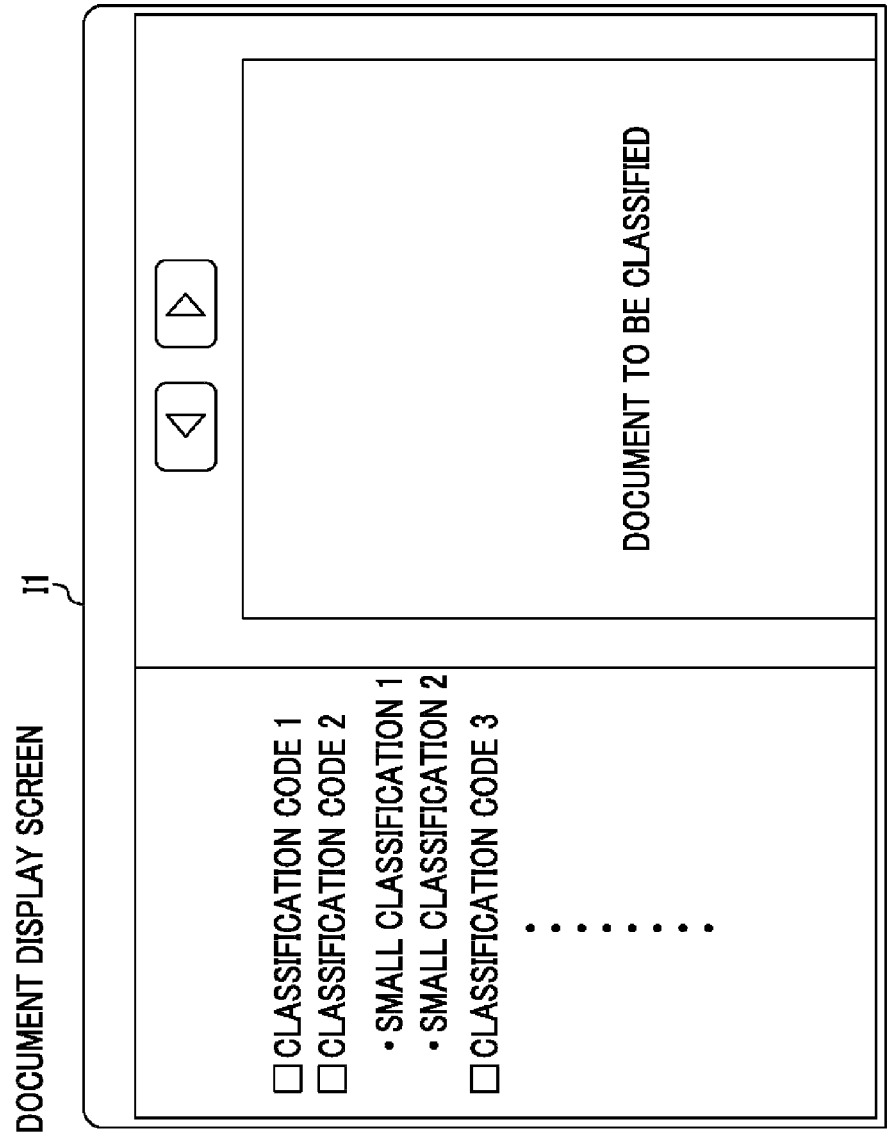

DOCUMENT CLASSIFICATION SYSTEM, DOCUMENT CLASSIFICATION METHOD, AND DOCUMENT CLASSIFICATION PROGRAM

CROSS-REFERENCE TO RELATED APPLICATION(S)

This application is a continuation of U.S. application Ser. No. 14/472,296 filed Aug. 28, 2014, which is a 371 application and claims priority to and the benefit of International Application No. PCT/JP2013/055330, filed Feb. 28, 2013, entitled "DOCUMENT CLASSIFICATION SYSTEM, DOCUMENT CLASSIFICATION METHOD, AND DOCUMENT CLASSIFICATION PROGRAM," which claims priority to and the benefit of Japanese Patent Application No. JP 2012-044382, filed Feb. 29, 2012, in Japan. The contents of the prior applications are expressly incorporated herein by reference in their entireties.

TECHNICAL FIELD

The present invention relates to a document classification system, a document classification method, and a document classification program, and more particularly, to a document classification system, a document classification method, and a document classification program for document information related to a lawsuit.

BACKGROUND ART

In recent years, means or technique has been proposed which collects devices, data, and electronic records required to find or investigate the cause; analyzes them; and substantiates legal evidence, when there is a crime or a legal conflict related to computers, such as illegal access or confidential information leakage.

In particular, in a U.S. civil suit, electronic discovery (eDiscovery) is required and both the plaintiff and the defendant in the lawsuit have the responsibility to submit all of the related digital information as evidence. Therefore, the digital information recorded in the computer or the server needs to be submitted as evidence.

With the rapid development and spread of IT, most of information is created using the computer in the present business world. Therefore, there is flood of digital information within the company.

Therefore, during the pretrial period, when evidence exhibit is submitted to court, even confidential digital information which is not necessarily related to the lawsuit may be likely included in the evidence exhibit submission. In other words, there is a problem that confidential document information which is not related to the lawsuit is submitted.

In recent years, a technique related to document information in a forensic system has been proposed in PTL 1 to PTL 3. PTL 1 discloses a forensic system which designates a specific person from one or more users included in user information, extracts only digital document information which is accessed by the specific person on the basis of access history information about the designated specific person, sets additional information indicating whether each document file of the extracted digital document information is related to the lawsuit, and outputs the document files related to the lawsuit on the basis of the additional information.

PTL 2 discloses a forensic system which displays recorded digital information, sets user specification information indicating whether each of plurality of document files is related to any one of the users included in user information, sets settings such that the set user specification information is recorded in a storage section, designates a least one or more users, searches for a document file in which the user specification information corresponding to the designated user is set, sets additional information indicating whether the searched document file is related to the lawsuit on a display section, and outputs the documentfile related to the lawsuit on the basis of the additional information.

PTL 3 discloses a forensic system which receives the designation of at least one or more document files included in digital document information, receives designation indicating a language used to translate the designated document file, translates the designated document file into the designated language, extracts a common document file indicating the same content as the designated document file from digital document information recorded in a recording section, generates translation-related information indicating that the extracted common document file is translated by quoting the content of the translated document file, and outputs a document file related to the lawsuit on the basis of the translation-related information.

CITATION LIST

Patent Literature (PTL)

[PTL 1] JP-A-2011-209930
[PTL 2] JP-A-2011-209931
[PTL 3] JP-A-2012-32859

SUMMARY OF INVENTION

Technical Problem

However, for example, in the forensic systems disclosed in PTL 1 to PTL 3, a huge amount of document information of the users who use a plurality of computers and servers is collected.

In an operation of classifying whether a huge amount of digital document information is appropriate as evidentiary support of the lawsuit, a user, who is called a reviewer, needs to visibly check the digital document information and to classify each document information item. Therefore, it takes a lot of effort to perform the operation.

The invention has been made in view of the above-mentioned problems and an object of the invention is to provide a document classification system, a document classification method, and a document classification program which collect digital document information and automatically assign a classification code to the document information, thereby reducing the burden of classifying the document information used in a lawsuit.

Solution to Problem

According to an aspect of the invention, there is provided a document classification system that acquires digital information recorded in a plurality of computers or servers, analyzes document information included in the acquired digital information, and classifies the document information so as to be facilitated in a lawsuit. The document classification system includes: an extraction section that extracts a document group, which is a data set including a predetermined number of documents, from the document information; a document display section that displays the extracted document group on a screen; a classification code receiving section that receives a classification code which is assigned to the displayed document group by a user on the basis of relation to the lawsuit; a selection section that classifies the extracted document group for each classification code on the basis of the classification code, analyzes a keyword which commonly appears in the classified document group, and selects the keyword; a database that records the selected keyword; a search section that searches for the keyword recorded in the database from the document information; a score calculation section that calculates a score indicating relation between the classification code and the document, using the search result of the search section and the analysis result of the selection section; and an automatic classification section that automatically assigns the classification code on the basis of the result of the score.

The term "document" means data including one or more keywords. Examples of the document include electronic mail, a presentation document, a table calculation document, a meeting document, a contract, an organization chart, and a business plan.

The term "keyword" means a string of letters with predetermined meaning in a given language. For example, when keywords are selected from a sentence "classify documents," "document," and "classify" may be the keywords.

The term "classification code" means an identifier used to classify documents. For example, when document information is used as evidence in a lawsuit, the classification code may be assigned based on which type of evidence the document information falls under.

The term "score" is used to quantitatively evaluate the strength of relation to a specific classification code in a given document. For example, the score calculation section may calculate the score on the basis of the keyword which appears in a document group and the weight of each keyword. For example, the weight may be given to the keyword and may be determined on the basis of the amount of transmitted information for each classification code.

In the document classification system according to the invention, the extraction section may perform random sampling when extracting the document group from the document information.

In the document classification system according to the invention, the search section may have a function of searching for the keyword from document information including a document to which the classification code is not assigned. The score calculation section may have a function which calculates the score indicating the relation between the classification code and the document on the basis of the search result of the search section and the analysis result of the selection section. The automatic classification section may have a function which extracts a document with the classification code which is not received by the classification code receiving section and automatically assigns the classification code to the document information.

In the document classification system according to the invention, the database may further include a function which extracts a related term related to the classification code and records the related term. The search section may further include a function which searches for the related term from the document information. The score calculation section may further include a function which calculates the score on the basis of the search result of the related term by the search section. The automatic classification section may further include a function which automatically assigns the classification code on the basis of the score which is calculated using the related term.

The document classification system according to the invention may further include a document exclusion section that selects a document which does not include the keyword selected by the selection section, the related term, and the keyword correlated with the classification code among the documents included in the document group and excludes the selected document from a classification target of the automatic classification section.

The document classification system according to the invention may further include a learning section that increases or decreases the number of related terms and keywords which are selected by the selection section and are correlated with the classification codes recorded in the database, on the basis of the analysis result of the selection section and the score calculated by the score calculation section.

According to another aspect of the invention, there is provided a document classification method that is performed in a document classification system which acquires digital information recorded in a plurality of computers or servers, analyzes document information included in the acquired digital information, and classifies the document information so as to be facilitated in a lawsuit. The document classification method includes: extracting a document group, which is a data set including a predetermined number of documents, from the document information; displaying the extracted document group on a screen; receiving a classification code which is assigned to the displayed document group by a user on the basis of relation to the lawsuit; classifying the extracted document group for each classification code on the basis of the classification code, analyzing a keyword which commonly appears in the classified document group, and selecting the keyword; recording the selected keyword; searching for the recorded keyword from the document information; calculating a score indicating relation between the classification code and the document, using the search result and the analysis result; and automatically assigning the classification code on the basis of the result of the score.

According to still another aspect of the invention, there is provided a document classification program that, in a document classification system which acquires digital information recorded in a plurality of computers or servers, analyzes document information included in the acquired digital information, and classifies the document information so as to be facilitated in a lawsuit, causes a computer to perform: a function of extracting a document group, which is a data set including a predetermined number of documents, from the document information; a function of displaying the extracted document group on a screen; a function of receiving a classification code which is assigned to the displayed document group by a user on the basis of relation to the lawsuit; a function of classifying the extracted document group for each classification code on the basis of the classification code, analyzing a keyword which commonly appears in the classified document group, and selecting the keyword; a function of recording the selected keyword; a function of searching for the recorded keyword from the document information; a function of calculating a score indicating relation between the classification code and the document, using the search result and the analysis result; and a function of automatically assigning the classification code on the basis of the result of the score.

Advantageous Effects of Invention

The document classification system, the document classification method, and the document classification program according to the invention extract a document group, which is a data set including a predetermined number of documents, from document information, display the extracted document group on a screen, receive a classification code which is assigned to the displayed document group by a user on the basis of relation to a lawsuit, classify the extracted document group for each classification code on the basis of the classification code, analyze a keyword which commonly appears in the classified document group, select the keyword, record the selected keyword, search for the recorded keyword from the document information, calculate a score indicating relation between the classification code and the document, using the search result and the analysis result, and automatically assign the classification code on the basis of the result of the score. In this way, it is possible to reduce the effort of the reviewer for a classification operation.

In the document classification system according to the invention, the search section has a function which searches for the keyword from document information including a document to which the classification code is not assigned. The score calculation section has a function which calculates the score indicating the relation between the classification code and the document on the basis of the search result of the search section and the analysis result of the selection section. The automatic classification section has a function which extracts a document with the classification code which is not received by the classification code receiving section and automatically assigns the classification code to the document information. According to this structure, it is possible to automatically assign the classification code to the document information with the classification code which is not received by the classification code receiving section according to the classification regularity of the reviewer.

The document classification system according to the invention includes the learning section that increases or decreases the number of related terms and keywords which are selected by the selection section and are correlated with the classification code recorded in the database, on the basis of the analysis result of the selection section and the score calculated by the score calculation section. According to this structure, the accuracy of classification is improved with the repetition of classification.

In the invention, the database extracts a related term related to the classification code and records the related term. The search section searches for the related term from the document information. The score calculation section calculates the score on the basis of the search result of the related term by the search section. The automatic classification section automatically assigns the classification code on the basis of the score which is calculated using the related term. A document which does not include the keyword selected by the selection section, the related term, and the keyword correlated with the classification code is selected among the documents included in the document group and the selected document is excluded from a classification target of the automatic classification section. According to this structure, it is possible to classify documents effectively. This makes the use of the collected digital information in a lawsuit easy.

BRIEF DESCRIPTION OF DRAWINGS

FIG. 6 is chart illustrating the process flow of a score calculation section in the embodiment of the invention.

FIG. 7 is chart illustrating the process flow of an automatic classification section in the embodiment of the invention.

FIG. 14 is a diagram illustrating a document display screen in the embodiment of the invention.

DESCRIPTION OF EMBODIMENTS

[First Embodiment]

Figure 1:
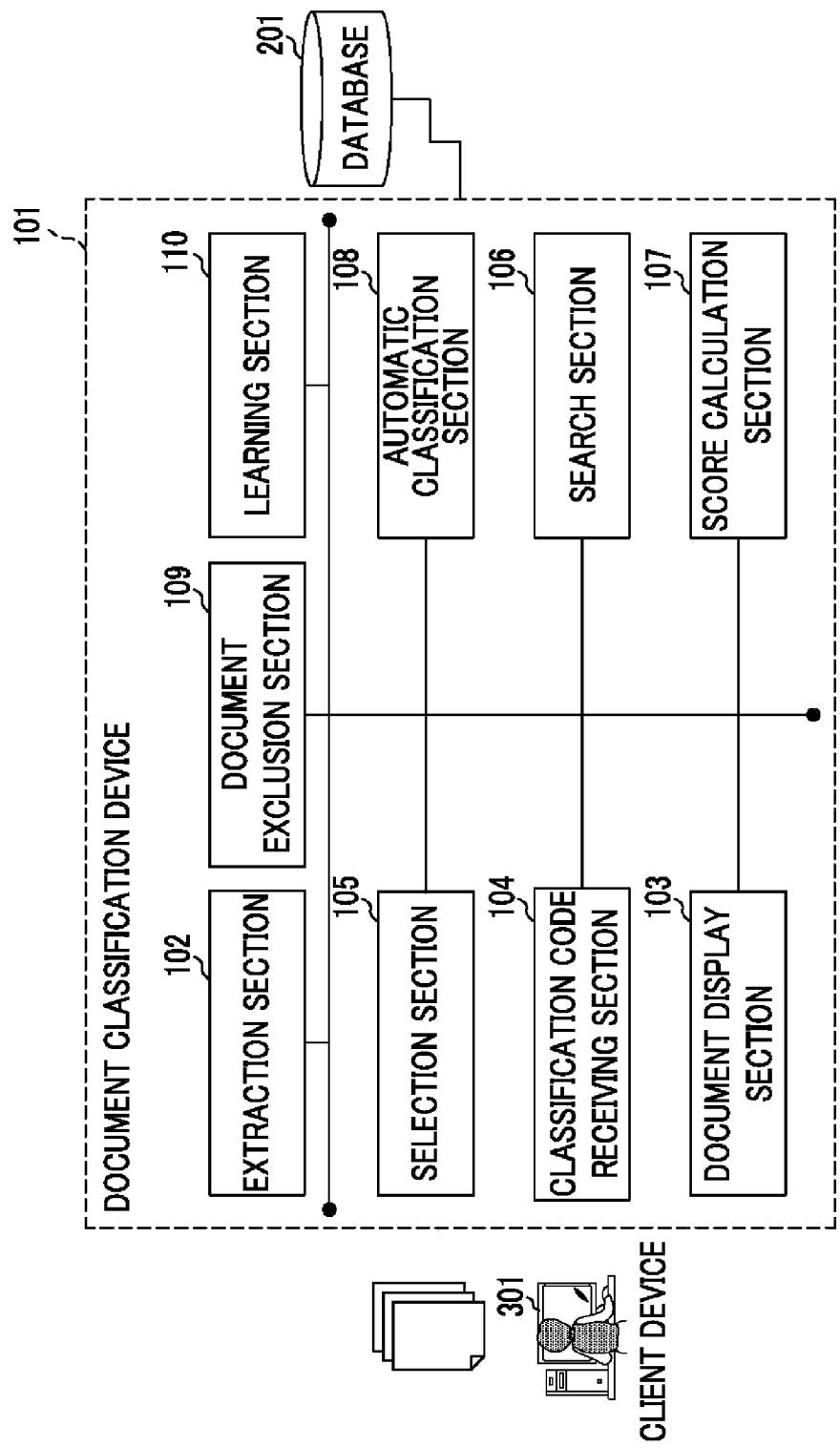
FIG. 1 is a diagram illustrating the structure of a document classification system according to a first embodiment of the invention.

Hereinafter, embodiments of the invention will be described with reference to the accompanying drawings. FIG. 1 is a diagram illustrating the structure of a document classification system according to a first embodiment.

The first embodiment is an example in which documents related to a product A, which is an accused product, are classified when order for production of documents is issued in a patent infringement suit.

The document classification system according to the invention includes an extraction section 102 that extracts a document group, which is a data set including a predetermined number of documents, from document information, a document display section 103 that displays the extracted document group on a screen, a classification code receiving section 104 that receives a classification code which is assigned to the displayed document group by a user, who is called a reviewer, on the basis of relation to a lawsuit, a selection section 105 that classifies the extracted document group for each classification code on the basis of the classification code, analyzes a keyword which commonly appears in the classified document group, and selects the keyword, a database 201 that records the selected keyword, a search section 106 that searches for the keyword recorded in the database 201 from the document information, a score calculation section 107 that calculates a score indicating the relation between the classification code and the document on the basis of the search result of the search section 106 and the analysis result of the selection section 105, an automatic classification section 108 that automatically assigns the classification code on the basis of the result of the score, a document exclusion section 109 that excludes the selected document from a classification target of the automatic classification section 108, and a learning section 110 that increases or decreases the number of keywords which are selected by the selection section 105, the number of keywords which are correlated with the classification code recorded in the database 201, and the number of related terms, on the basis of the analysis result of the selection section 105 and the score calculated by the score calculation section.

In the first embodiment, the document classification system includes a document classification device 101 including the extraction section 102, the document display section 103, the classification code receiving section 104, the selection section 105, the search section 106, the score calculation section 107, the automatic classification section 108, the document exclusion section 109, and the learning section 110, the database 201, and a client device 301 which is used by the reviewer. A plurality of client devices 301 may be provided in one document classification system.

The document classification device 101 and the client device 301 are computers or servers, in which a CPU executes a program recorded on a ROM on the basis of various kinds of inputs to operate as various functional sections.

The classification code means an identifier which is used to classify documents. When the document information is used as evidence in a lawsuit, the classification code may be assigned based on which type of evidence the document information falls under. In the first embodiment, as the classification codes, the following three codes are used: a classification code "nonresponsive" indicating a document which is not admissible in the present lawsuit; a classification code "responsive" indicating that a document needs to be submitted as evidence; and a classification code "HOT" indicating a document which is particularly related to the product A. Among them, the documents with the code "HOT" are classified.

The term "document" is digital information which is submitted as evidence in a lawsuit and means data including one or more words. For example, the documents include electronic mail, a presentation document, a table calculation document, a meeting document, a contract, an organization chart, and a business plan. In addition, scan data can be treated as the document. In addition, In this case, the document classification system may include an optical character reader (OCR) device such that the scan data can be converted into text data. When the scan data is changed to text data by the OCR device, it is possible to analyze or search for a keyword and related terms from the scan data.

For example, in the first embodiment, the code "responsive" is assigned to the minutes of meeting or electronic mail in which the content of a meeting about the product A is described, the code "HOT" is assigned to a development plan or a specification for the product A, and the code "nonresponsive" is assigned to a document about a regular meeting which is not related to the product A.

In addition, the term "keyword" means a string of letters with predetermined meaning in a given language. For example, when keywords are selected from a sentence "classify a document," "document" and "classify" may be the keywords. In the first embodiment, keywords "infringement," "lawsuit," and "patent publication No. OO" are mainly selected.

The database 201 is a recording device that records data on an electronic medium. The database 201 may be provided in the document classification device 101 or it may be provided as, for example, a storage device outside the document classification device 101.

The document classification device 101, the database 201, and the client device 301 are connected to each other by a wired or wireless network. Alternatively, they may be used in the form of cloud computing.

The database 201 records keywords for each classification code. In addition, a keyword which can be determined to be included in a document with high relation to the product A and to be immediately assigned with the code "HOT" from the result of the past classification process can be registered in advance. For example, the following keywords can be registered: the main function name of the product A; and keywords "lawsuit," "warning," and "patent publication." In addition, similarly, general terms with high relation to the document group to which the code "HOT" is assigned since the document group has high relation to the product A may be extracted on the basis of the result of the past classification process and the extracted general terms may be registered as the related terms.

The number of keywords and related terms which are registered once in the database 201 is increased or decreased on the basis of the learning result of the learning section 110. In addition, the keywords and the related terms can be additionally registered or deleted manually.

When extracting a document group from the document information, the extraction section 102 can randomly perform sampling. In the first embodiment, the extraction section 102 randomly extracts 20% of documents from all document information and the extracted documents are classified by the reviewer. The extraction section 102 may freely set the percentage of the documents extracted from all document information. In addition, the extraction section 102 may extract the documents from a portion of all document information.

The document display section 103 presents a document display screen I1 shown in FIG. 14 to the client device 301. As shown in FIG. 14, the document display screen II has a screen structure in which the document to be classified is displayed at the center and the classification code is displayed on the left side. The document to be classified and the classification code to be assigned can be displayed on one screen. In addition, a screen structure may be used in which the document and the classification code are displayed on different screens.

In the first embodiment, classification code 1 on the document display screen I1 means the code "nonresponsive", classification code 2 means the code "responsive", and classification code 3 means the code "HOT." Among the documents with the code "responsive" assigned thereto, small classification 1 is assigned to a document which is related to the price of the product A and small classification 2 is assigned to a document which is related to the development schedule of the product A. A plurality of small classifications may be provided to one classification code or the small classifications may not be provided.

When the reviewer visibly checks the document information displayed on the document display section 103 and determines the classification code of each document, the classification code receiving section 104 can assign the classification codes to the documents on the basis of the determination result and classify the documents. Therefore, it is possible to classify the documents on the basis of the assigned classification codes.

The selection section 105 analyzes the document information classified by the classification code receiving section 104 and selects a keyword which commonly appears in the document information to which each of the classification codes "nonresponsive," "responsive," and "HOT" is assigned as the keyword of the classification code.

Figure 2:
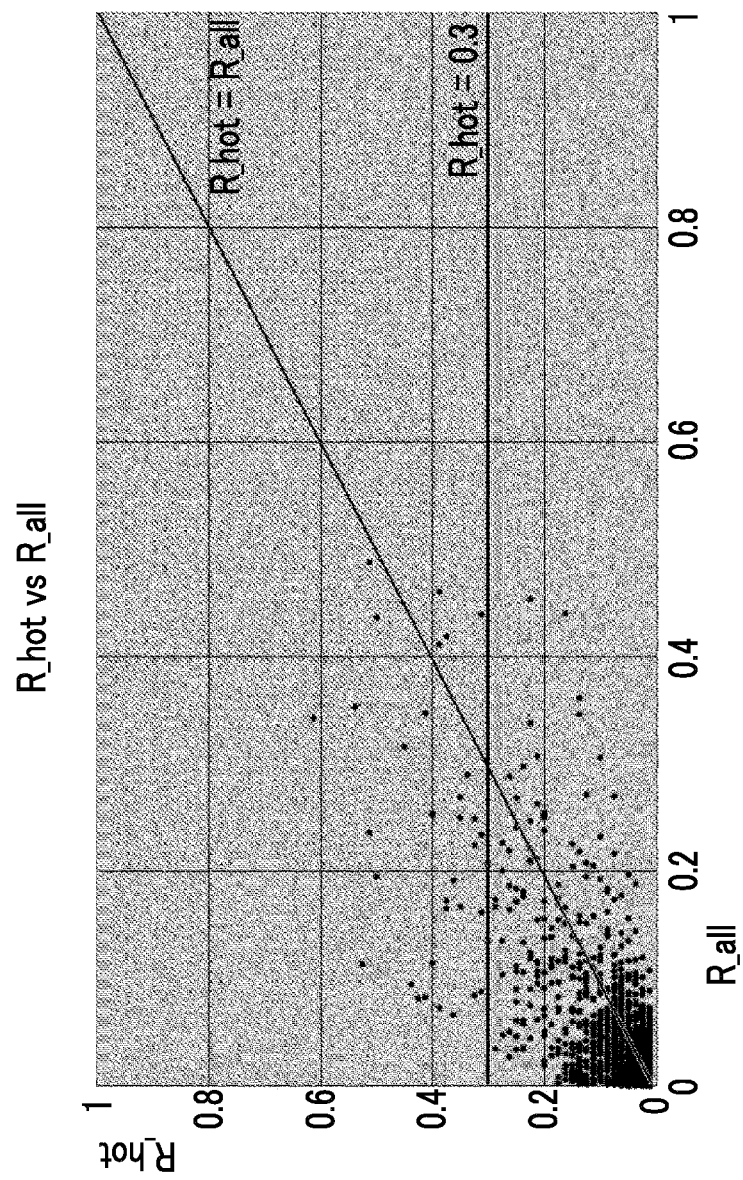
FIG. 2 is a graph illustrating the analysis result of a selection section in the embodiment of the invention.

FIG. 2 is a graph illustrating the analysis result of the document to which the code "HOT" selected by the selection section 105 is assigned.

In FIG. 2, the vertical axis R_hot indicates the percentage of the documents which include the keyword selected as the keyword related to the code "HOT" and to which the code "HOT" is assigned among all documents to which the code "HOT" is assigned by the reviewer. The horizontal axis indicates the percentage of the documents which include the keyword selected by the selection section 105 among all documents classified by the reviewer.

In the first embodiment, the selection section 105 can select the keyword which is plotted above a straight line R_hot=R_all as the keyword of the classification code.

The search section 106 has a function of searching for a specific keyword from a target document. The search section 106 searches for a document including the keyword selected by the selection section 105 or the related term extracted from the database 201 from a document group including the documents with the classification code which is not received by the classification code receiving section 104.

The score calculation section 107 can calculate the score on the basis of the keyword which appears in the document group and a weight of each keyword, using the following Expression (1):

$$\mathrm{Scr} = \Sigma_{i=0}^{N_i} * (m_i * \mathrm{wgt}_i^2) / \Sigma_{i=0}^{N_i} * \mathrm{wgt}_i^2 \quad \text{[Expression (1)]}$$

(where $m_i$ is the frequency of appearance of an i-th keyword or related word and $\mathrm{wgt}_i^2$ is a weight of the i-th keyword or related word).

The score is used to quantitatively evaluate the strength of relation to a specific classification code in a given document.

When the classification code is automatically assigned to document information on the basis of the calculated score, the automatic classification section 108 can have a function which extracts a document with the classification code which is not received by the classification code receiving section 104 and automatically assigns the classification code to the document.

The document exclusion section 109 can search for a document which does not include any of the keyword and the related term which are registered in the database 201 in advance and the keyword which is selected by the selection section 105 in the document information to be classified and exclude the document from the classification target in advance.

The learning section 110 learns the weight of each keyword on the basis of the result of the classification process and increases or decreases the number of keywords and related terms registered in the database 201 on the basis of the learning result.

The weight of each keyword is of each keyword and can be determined on the basis of the amount of transmitted information for each classification code. The weight can be learned by repeatedly performing the classification process using the following Expression (2) and the accuracy of the weight can be improved:

$$\mathrm{wgt}_{i,L} = \sqrt{\mathrm{wgt}_{L-i}^2 + \gamma_L \mathrm{wgt}_{i,L}^2 - \theta} = \sqrt{\mathrm{wtg}_{i,L}^2 + \Sigma_{i=1}^{L}(\gamma_i \mathrm{wgt}_{i,l}^2 - \theta)} \quad \text{[Expression (2)]}$$

(where $\mathrm{wgt}_{i,o}$ is a weight of an i-th selected keyword before learning, $\mathrm{wgt}_{i,L}$ is a weight of the i-th selected keyword after an L-th learning operation, "YL is a learning parameter in the L-th learning operation, and $\theta$ is a threshold value of a learning effect).

The learning section may use a learning method which uses a neural network and reflects the classification result in the weight.

The client device 301 is operated by the reviewer to check the document information and to determine the classification code to be assigned.

Figure 3:
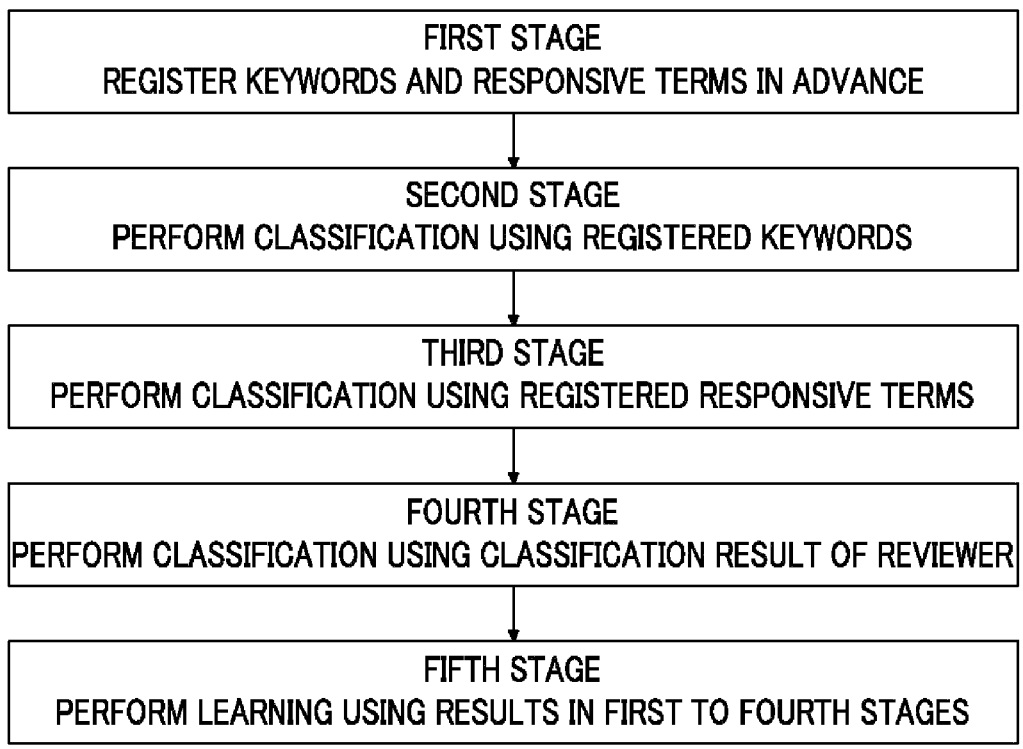
FIG. 3 is chart illustrating the flow of a process in each stage in the embodiment of the invention.

In the first embodiment, a classification process is performed in five stages according to the flowchart shown in FIG. 3.

In a first stage, the keywords and the related terms are registered in advance using the result of the past classification process. In this case, the registered keyword is a keyword to which the code "HOT" is immediately assigned when, for example, the name of a function or technique which infringes the function or technique of the product A is included in a document.

In a second stage, a document including the keyword registered in the first stage is searched for from all document information. When the document is detected, the code "HOT" is assigned to the document.

In a third stage, the related term registered in the first stage is searched for from all document information, the score of the document including the related term is calculated, and classification is performed.

In a fourth stage, after the reviewer determines the classification code, the classification code is automatically assigned on the basis of the classification regularity of the reviewer.

In a fifth stage, learning is performed using the results of the first to fourth stages.

<First Stage>

Figure 4A:
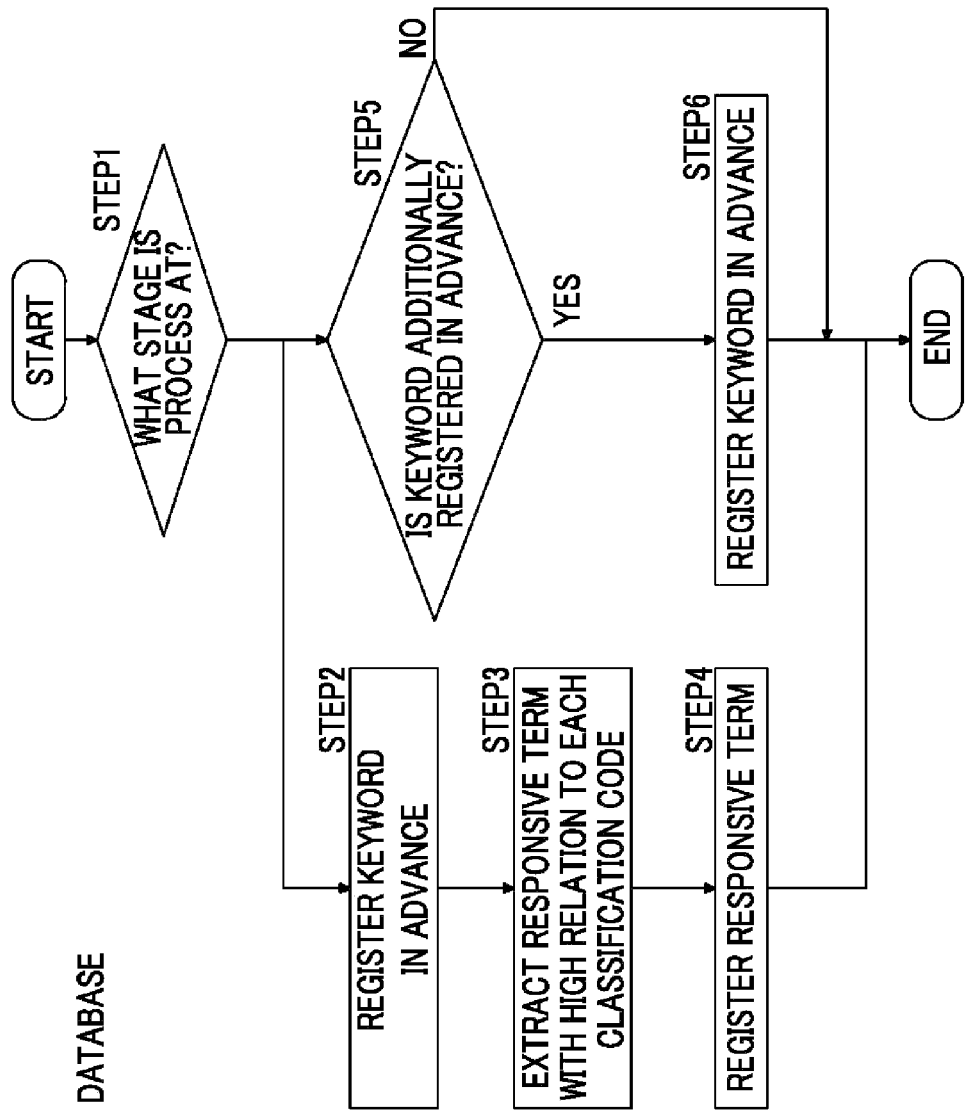
FIGS. 4A and 4B are charts illustrating the process flow of a database in the embodiment of the invention.
Figure 4B:
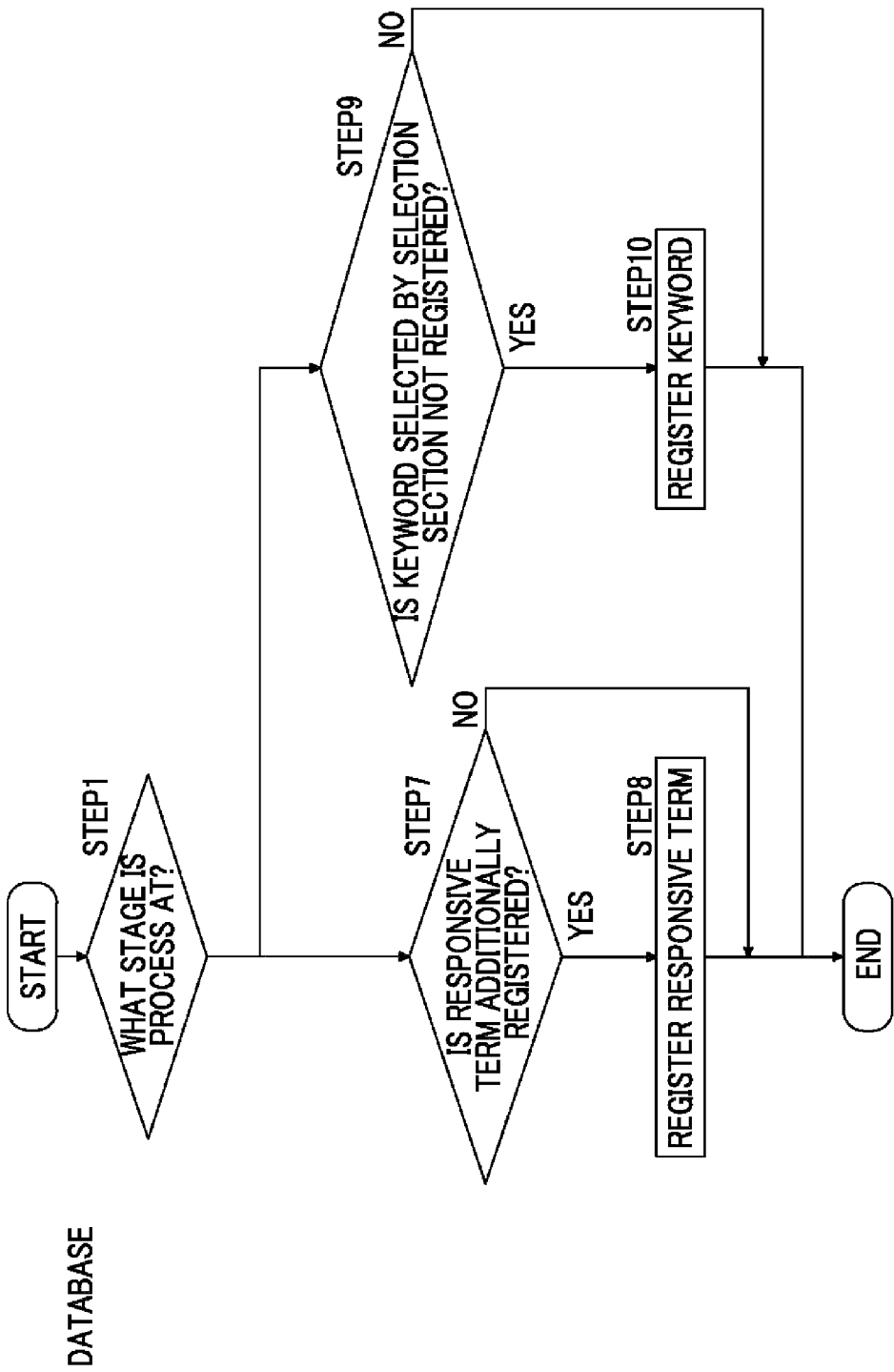
Figure 5A:
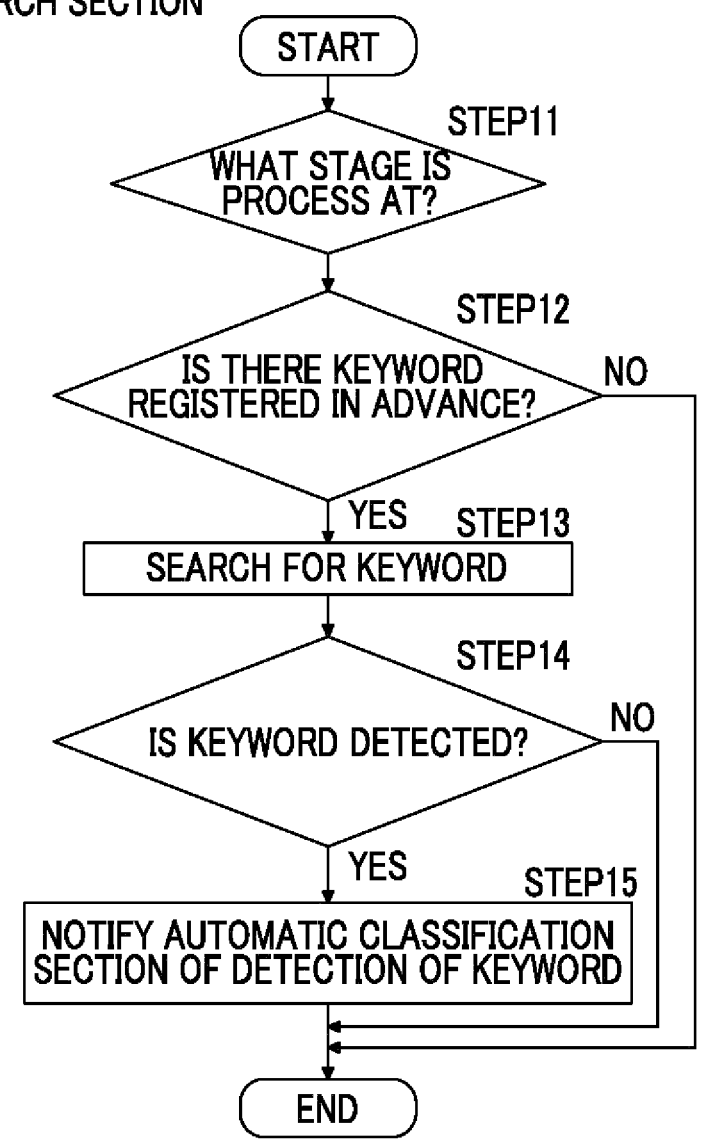
FIGS. 5A to 5C are charts illustrating the process flow of a search section in the embodiment of the invention.
Figure 5B:
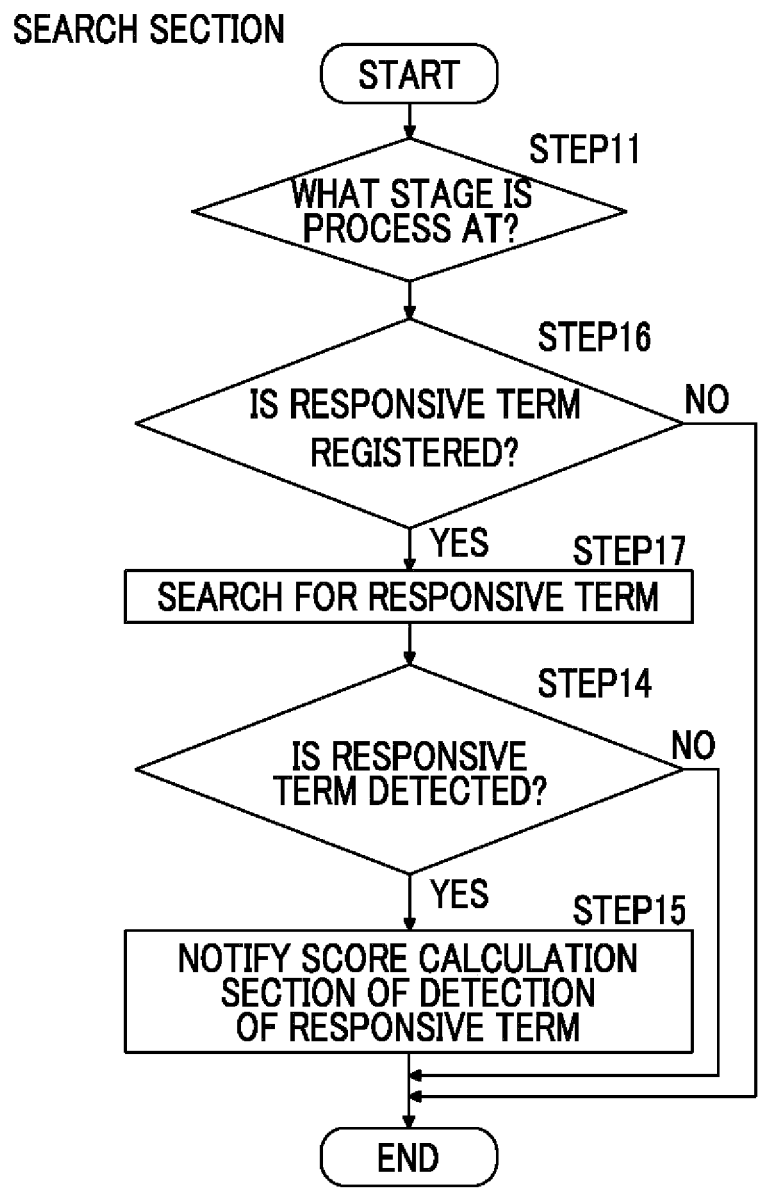
Figure 5C:
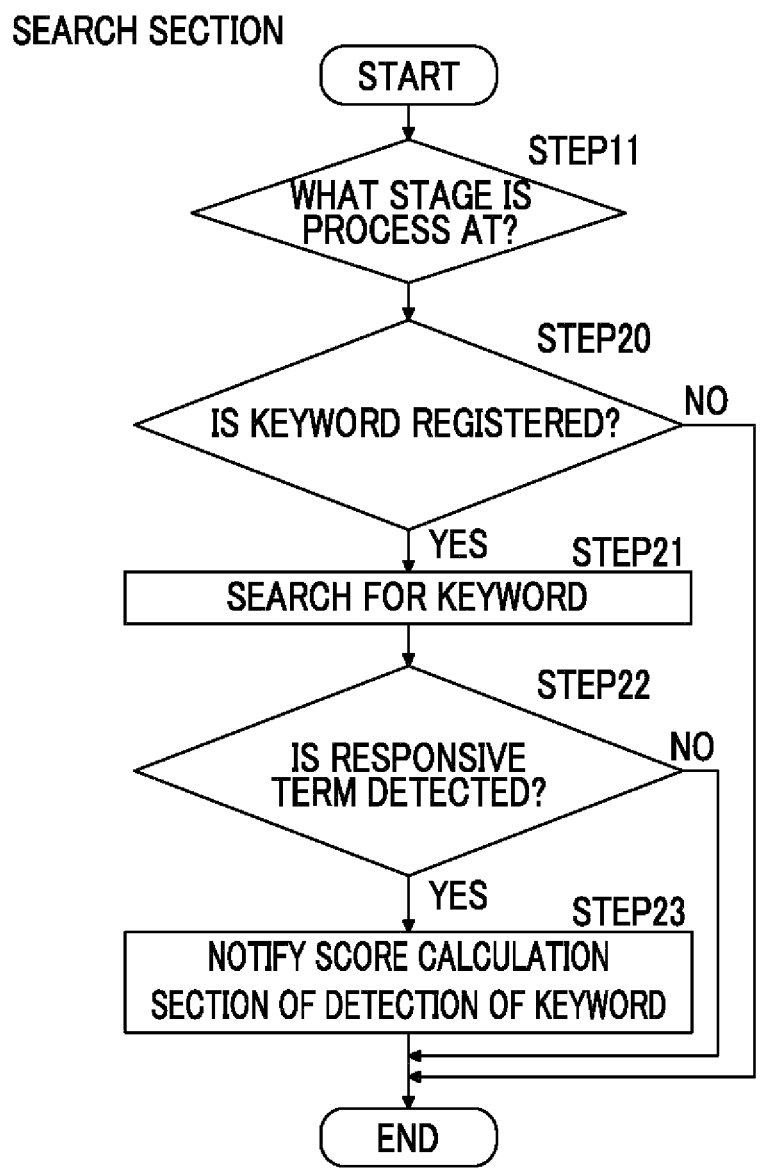
Figure 8:
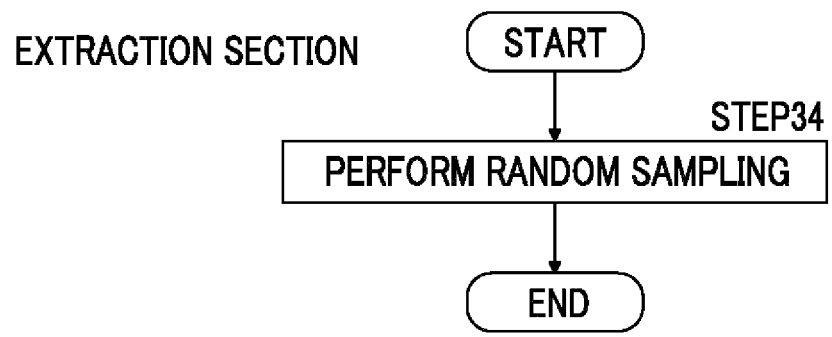
FIG. 8 is chart illustrating the process flow of an extraction section in the embodiment of the invention.
Figure 9:
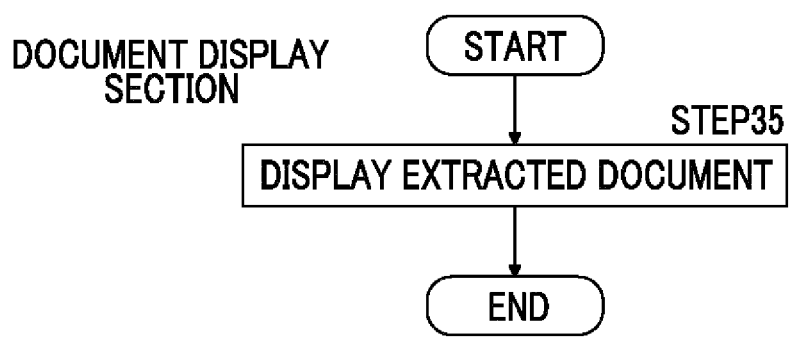
FIG. 9 is chart illustrating the process flow of a document display section in the embodiment of the invention.
Figure 10:
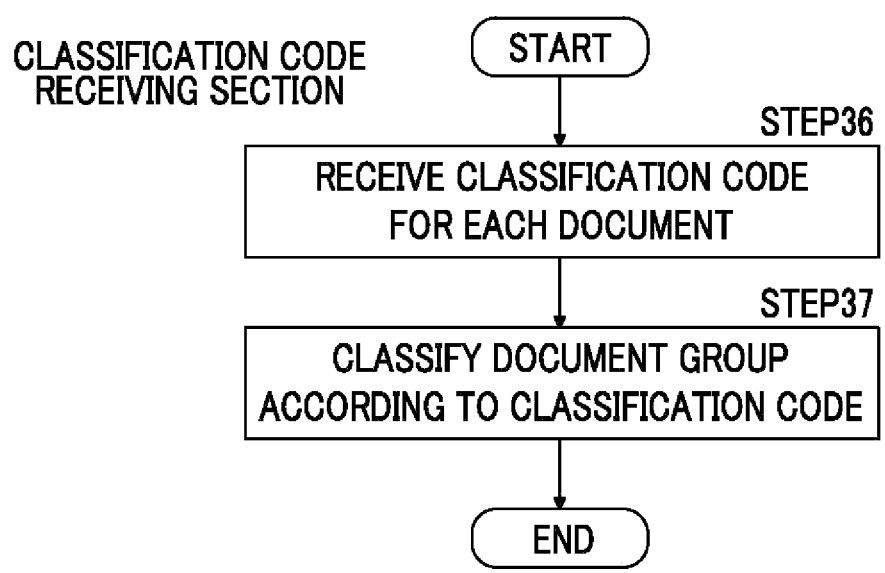
FIG. 10 is chart illustrating the process flow of a classification code receiving section in the embodiment of the invention.
Figure 11:
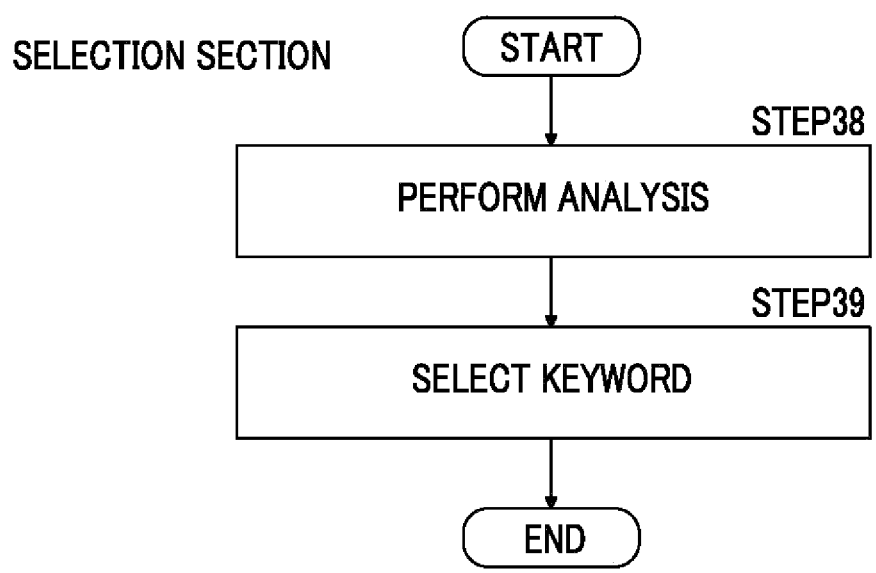
FIG. 11 is chart illustrating the process flow of a selection section in the embodiment of the invention.

The process flow of the database 201 in the first stage will be described in detail with reference to FIGS. 4A and 4B. The database 201 determines the stage number of the process to be performed and selects the process in the first stage (STEP 1: the first stage) In this stage, first, keywords are registered in the database 201 in advance (STEP 2) In this case, a keyword which can be determined to be included in a document with high relation to the product A and to be immediately assigned with the code "HOT" from the result of the past classification process is registered in advance. In addition, similarly, a general term which has high relation to a document group to which the code "HOT" is assigned since the document group has high relation to the product A on the basis of the result of the past classification process is extracted (STEP 3) and the extracted general term is registered as the related term (STEP 4).

<Second Stage>

The process flow of the database 201, the search section 106, and the automatic classification section 108 in the second stage will be described in detail with reference to FIGS. 4A and 4B, Figs. SA to SC, and FIG. 7, respectively.

The database 201 determines the stage number of the process to be performed and selects the process in the second stage (STEP 1: the second stage). When there is a keyword which needs to be further registered in advance in the database 201 (STEP 5: YES), the keyword is additionally registered (STEP 6). When there is no keyword to be additionally registered (STEP 5: NO) and after the process in STEP 6 is completed, the search section 106 determines the stage number of the process to be performed and selects the process in the second stage (STEP 11: the second stage). In this stage, first, the search section 106 determines whether there are keywords which have been registered in advance in the database 201 in the first stage and the second stage (STEP 12). When there is no keyword which is registered in advance (STEP 12: NO), the process in the second stage ends.

When there is a keyword which is registered in advance (STEP 12: YES), the search section 106 searches for a document including the keyword from all document information to be classified (STEP 13). When there is no document including the searched keyword (STEP 14: NO), the process in the second stage ends. On the other hand, when a document including the searched keyword is detected (STEP 14: YES), the search section 106 notifies the automatic classification section 108 of the detection of the document (STEP 15).

When receiving the notice from the search section 106 (STEP 29: the second stage; STEP 30: YES) the automatic classification section 108 assigns the code "HOT" to the document which is the notification target and ends the process. When the notice is not received from the search section 106 (STEP 29: the second stage; STEP 30: NO), the automatic classification section 108 does not perform any process.

<Third Stage>

The process flow of the database 201, the search section 106, the score calculation section 107, and the automatic classification section 108 in the third stage will be described in detail with reference to FIGS. 4A and 4B, Figs. 5A to 5C, FIG. 6, and FIG. 7, respectively.

The database 201 determines the stage number of the process to be performed and selects the process in the third stage (STEP 1: the third stage). When there is a related term which needs to be further registered in advance in the database 201 (STEP 7: YES), the related term is additionally registered (STEP 8). When the related term does not need to be additionally registered (STEP 7: NO), the process in the third stage ends.

After the process in STEP 8 is completed, the search section 106 determines the stage number of the process to be performed and selects the process in the third stage (STEP 11: the third stage). In this stage, the search section 106 determines whether there is a related term which is registered in the database 201 in the first stage and the second stage (STEP 16). When there is no keyword which is registered in advance (STEP 16: NO), the process in the third stage ends.

When there is a related term (STEP 16: YES), the search section 106 searches for a document including the related term from all document information to be classified (STEP 17). When there is no document including the searched keyword (STEP 18: NO), the process in the third stage ends. On the other hand, when a document including the searched related term is detected (STEP 18: YES), the search section 106 notifies the score calculation section 107 of the detection of the searched related term (STEP 19).

When receiving the notice from the search section 106 (STEP 24: the third stage; STEP 23: YES), the score calculation section 107 calculates the score of each document from the type of the related term detected from the document and the weight of the related term using the above-mentioned Expression (1) and notifies the automatic classification section 108 of the score (STEP 28). When the notice indicating the detection of the related term is not received from the search section 106 (STEP 24: the third stage; STEP 23: NO), the process in the third stage ends.

When receiving the notice indicating the score from the score calculation section 107 (STEP 29: the third stage; STEP 32: YES), the automatic classification section 108 determines whether the score is greater than a threshold value for each document. The automatic classification section 108 assigns the code "HOT" to the document with the score greater than the threshold value. When there is no document with the score greater than the threshold value, the automatic classification section 108 ends the process, without assigning the classification code (STEP 33)

<Fourth Stage>

The process flow of the database 201, the search section 106, the score calculation section 107, the automatic classification section 108 the extraction section 102, the document display section 103, the classification code receiving section 104, and the selection section 105 in the third stage will be described in detail with reference to FIGS. 4A and 4B, FIGS. 5A to 5C, FIG. 6, FIG. 7, FIG. 8, FIG. 9, FIG. 10, and FIG. 11, respectively.

In the fourth stage, first, the extraction section 102 randomly samples a document from the document information to be classified and extracts the document group to which the classification code is manually assigned by the reviewer (STEP 34). The document display section 103 displays the extracted document group on the document display screen II (STEP 35)

The reviewer reads the content of each document in the document group displayed on the document display screen II, determines whether there is relation between the product A and the content of the document, and determines whether to assign the code "HOT". Examples of the document to which the code "HOT" is assigned by the reviewer include a report for the investigation result of the related art of the product A and a letter of warning from another person warning that the manufacture of the product A infringes a patent.

The classification code receiving section 104 receives the classification code assigned by the reviewer (STEP 36) and the document corresponding to the assigned classification code is classified (STEP 37).

The selection section 105 performs keyword analysis for each document classified in STEP 37 (STEP 38) and selects the common keyword which frequently appears in the document to which the code "HOT" is assigned (STEP 39).

[When the keyword which is selected by the selection section 105 in STEP 39 is not registered as the keyword related to the code "HOT" indicating that the document is related to the product A in the database 201 (STEP 1: third stage; STEP 9: YES), the keyword is registered. When the keyword is registered, no process is performed (STEP 1: the third stage; STEP 9: NO).

When the keyword d related to the code "HOT" is not registered in the database 201 (STEP 20: NO), the search section 106 ends the process in the fourth stage. When the keyword is registered (STEP 20. YES), the document which is extracted by the extraction section 102 and then classified by the reviewer is excluded from the search target and the keyword search process is performed for the remaining documents (STEP 21). In the search process, when the keyword is detected from the document (STEP 22 YES), the search sect ion 106 notifies the score calculation section 107 of the detection of the keyword (STEP 23).

When receiving the notice indicating the detection of the keyword (STEP 27: YES), the score calculation section 107 calculates the score f or each document using the above-mentioned Expression (I) and notifies the automatic classification sect ion of the score.

When receiving the notice from the score calculation sect ion 107 (STEP 32: YES), the automatic classification section 108 determines whether the score is greater than the threshold value for each document, assigns the code "HOT" to the document with a score greater than the threshold value, and ends the process, without assigning the code to the document with a score that is not greater than the threshold value (STEP 33).

<Fifth Stage>

Figure 12:
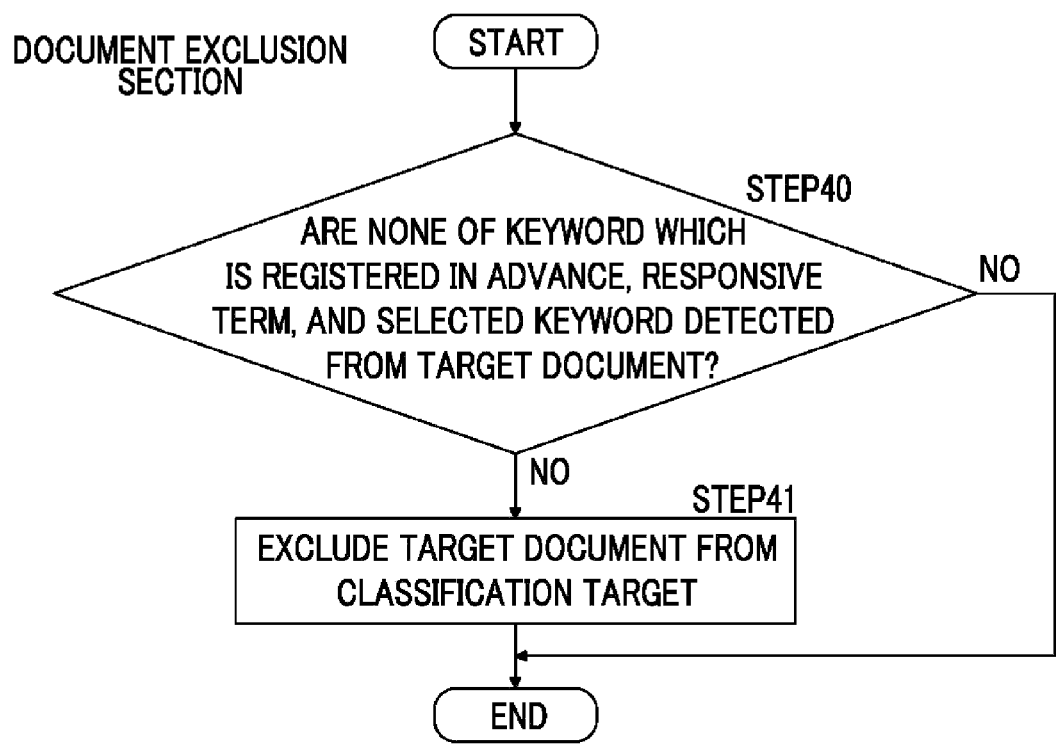
FIG. 12 is chart illustrating the process flow of a document exclusion section in the embodiment of the invention.
Figure 13:
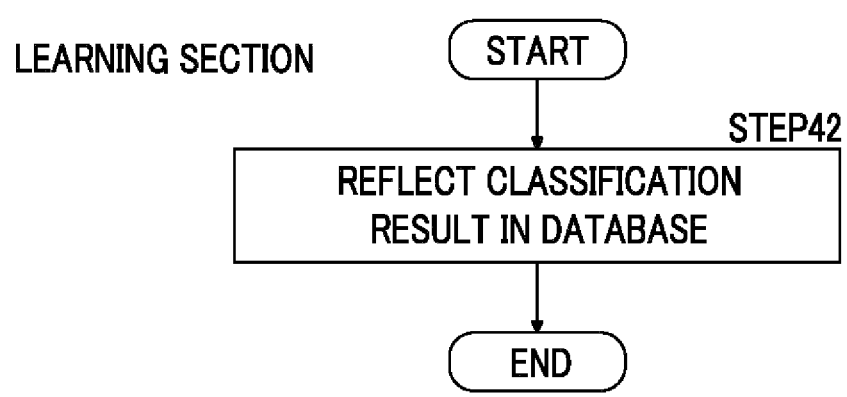
FIG. 13 is chart illustrating the process flow of a learning section in the embodiment of the invention.

The process flow of the document exclusion sect ion 109 and the learning sect ion 110 in the fifth stage will be described with reference to FIG. 12 and FIG. 13, respectively.

The document exclusion section 109 searches for a document including the keyword which is registered in advance in the first and second stages, the related term which is registered in the first and third stages, and the keyword which is registered in the fourth stage from the document group which has not been subjected to the processes in the first to fourth stages in the document information to be classified. When there is a document which does not include any of them (STEP 40: YES), the document exclusion section 109 excludes the document from the classification target in advance (STEP 41).

The learning section 110 learns the weight of each keyword on the basis of the results of the first to fourth processes using Expression (2) • The learning result is reflected in the database 201 (STEP 42).

[Other Embodiments]

Other embodiments of the invention will be described.

In the first embodiment, particularly, the patent infringement case has been described as an example. However, the document classification system according to the invention may adopt an electronic discovery (eDiscovery) system, such as a cartel or the Antimonopoly Law, and can be used in all lawsuits that require documents submission.

In the first embodiment, the process in the fourth stage which automatically assigns the classification code according to the classification regularity of the reviewer is performed after the processes in the first to third stages. However, the processes in the first to third stages may not be performed and only the process in the fourth stage may be performed.

First, the extraction section 102 extracts some document groups from the document information and the process in the fourth stage is performed for the extracted document groups. Then, the processes in the first to third stages may be performed on the basis of the keyword registered in the fourth stage.

In the fourth stage of the first embodiment, the search section 106 searches for the keyword selected by the selection section 105 from the document corresponding to the classification code which is not received by the classification code receiving section 104. However, the search section 106 may search for the keyword from all document information.

In the fourth stage of the first embodiment, the automatic classification section 108 automatically assigns the classification code only to the document corresponding to the classification code which is received by the classification code receiving section 104. However, the automatic classification section 108 may automatically assign the classification code to all document information.

The document classification system, the document classification method, and the document classification program according to the invention extract a document group, which is a data set including a predetermined number of documents, from document information, display the extracted document group on the screen, receive the classification code which is assigned to the displayed document group by the reviewer on the basis of relation to the lawsuit, classify the extracted document group for each classification code on the basis of the classification code, analyze the keyword which commonly appears in the classified document group, select the keyword, record the selected keyword, search for the recorded keyword from the document information, calculate the score indicating the relation between the classification codes and the documents on the basis of the search result and the analysis result, and automatically assign the classification code on the basis of the result of the score. Therefore, it is possible to reduce the effort required for a classification operation of the reviewer.

In the document classification system according to the invention, the search section has a function of searching for the keyword from document information including a document to which no classification code is assigned. The score calculation section calculates the score indicating the relation between the classification codes and the documents on the basis of the search result of the search section and the analysis result of the selection section. The automatic classification section has a function which extracts the document corresponding to the classification code which is not received by the classification code receiving section and automatically assigns the classification code to the document. In this case, the automatic classification section can automatically assign the classification code to document information corresponding to the classification code which is not received by the classification code receiving section, on the basis of the classification regularity of the reviewer.

The invention includes the learning section which increases or decreases the number of keywords and related terms which are selected by the selection section and are correlated with the classification code recorded in the database on the basis of the analysis result of the selection section and the score calculated by the score calculation section. In this case, the accuracy of classification is improved with the increase in the number of classifications.

In the invention, the database extracts the related term which is related to the classification code and records the extracted related term. The search section searches for the related term from the document information. The score calculation section calculates the score on the basis of the search result of the related term by the search section. The automatic classification section automatically assigns the classification code on the basis of the score which is calculated using the related term. Therefore, a document which does not include the keyword that is selected by the selection section, the related term, and the keyword that is correlated with the classification code is selected among the documents included in the document group and the selected document is excluded from the classification target of the automatic classification section. In this case, it is possible to effectively classify the documents. This makes it easy to use the collected digital information in a lawsuit.

REFERENCE SIGNS LIST

101: DOCUMENT CLASSIFICATION DEVICE
102: EXTRACTION SECTION
103: DOCUMENT DISPLAY SECTION
104: CLASSIFICATION CODE RECEIVING SECTION
105: SELECTION SECTION
106: SEARCH SECTION
107: SCORE CALCULATION SECTION
108: AUTOMATIC CLASSIFICATION SECTION
109: DOCUMENT EXCLUSION SECTION
110: LEARNING SECTION
201: DATABASE

301: CLIENT DEVICE
I1: DOCUMENT DISPLAY SCREEN

What is claimed is:

1. A document classification system comprising one or more processors configured to cause the document classification system to function as:
an extraction circuitry that extracts a plurality of documents by sampling the plurality of documents from document information as target of classification;
a classification code receiving circuitry that receives one or more classification codes for each of the plurality of documents for classifying each of the plurality of documents, wherein a classification code "HOT" is assigned to a document having a high relevancy among the plurality of documents;
a selection circuitry that selects one or more keywords which are plotted above a straight line R_hot=R_all,
wherein R_hot indicates a percentage of documents which include a keyword selected as the keyword related to the classification code "HOT" and to which the classification code "HOT" is assigned among all documents to which the classification code "HOT" is assigned, and
wherein R_all indicates a percentage of documents which include the one or more keywords selected by the selection circuitry among the plurality of documents;
a learning circuitry that learns a weight of each keyword selected by the selection circuitry;
a database that records the one or more keywords which are selected in each of the documents to which the one or more classification codes are assigned, wherein the one or more keywords are correlated with the weight of the keyword learned by the learning circuitry,
wherein the learning circuitry increases or decreases a number of keywords recorded in the database on the basis of the learning; and
a score calculation circuitry that calculates a score indicating the strength of a connection between an unclassified document to which the one or more classification codes are not assigned and the one or more classification codes, on the basis of the one or more keywords which are included in the unclassified document and the weight correlated with the one or more keywords in the database.

2. The document classification system according to claim 1, wherein the one or more processors are further configured to cause the document classification system to function as:
an automatic classification circuitry that assigns the classification code to the unclassified document on the basis of the score calculated by the score calculation circuitry.

3. The document classification system according to claim 1, wherein the one or more processors are further configured to cause the document classification system to function as:
a search circuitry that searches for the keyword recorded in the database from the unclassified document.

4. The document classification system according to claim 3,
wherein the automatic classification circuitry assigns the classification code to the unclassified document in a case where the score calculated by the score calculation circuitry is greater than a predetermined threshold value.

5. The document classification system according to claim 4, wherein the one or more processors are further configured to cause the document classification system to function as:
a document exclusion circuitry that excludes the unclassified document from the target of classification, wherein the unclassified document includes neither the keyword nor the related term.

6. The document classification system according to claim 3, wherein the one or more processors are further configured to cause the document classification system to function as:
a document exclusion circuitry that excludes the unclassified document from the target of classification, wherein the unclassified document does not include the keyword.

7. The document classification system according to claim 1,
wherein the database further records a related term which is related to the classification code, the related term being correlated with a weight of the related term,
wherein the search circuitry further searches for the related term from the unclassified document,
wherein the score calculation circuitry further calculates the score on the basis of the related term and the weight correlated with the related term.

8. The document classification system according to claim 1,
wherein the weight of the keyword is determined on the basis of an amount of information including the keyword for each classification code.

9. A document classification method that is performed in a document classification system that includes one or more processors, the document classification method comprising:
extracting a plurality of documents by sampling the plurality of documents from document information as target of classification;
receiving one or more classification codes for each of the plurality of documents for classifying each of the plurality of documents, wherein a classification code "HOT" is assigned to a document having a high relevancy among the plurality of documents;
selecting one or more keywords which are plotted above a straight line R_hot=R_all,
wherein R_hot indicates a percentage of documents which include a keyword selected as the keyword related to the classification code "HOT" and to which the classification code "HOT" is assigned among all documents to which the classification code "HOT" is assigned, and
wherein R_all indicates a percentage of documents which include the one or more keywords selected by the selection circuitry among the plurality of documents;
learning a weight of each keyword selected by the selection circuitry;
recording, in a database, the one or more keywords which are selected in each of the documents to which the one or more classification codes are assigned, wherein the one or more keywords are correlated with the weight of the keyword learned,
increasing or decreasing a number of keywords recorded in the database on the basis of the learning; and
calculating a score indicating the strength of a connection between an unclassified document to which the one or more classification codes are not assigned and the one or more classification codes, on the basis of the one or more keywords which are included in the unclassified document and the weight correlated with the one or more keywords in the database.

10. A document classification program stored in a non-transitory computer-readable medium, which when executed by one or more processors included in a document classification system, causes the document classification system to perform a method comprising:

extracting a plurality of documents by sampling the plurality of documents from document information as target of classification;

receiving one or more classification codes for each of the plurality of documents for classifying each of the plurality of documents, wherein a classification code "HOT" is assigned to a document having a high relevancy among the plurality of documents;

selecting one or more keywords which are plotted above a straight line R_hot=R_all, wherein R_hot indicates a percentage of documents which include a keyword selected as the keyword related to the classification code "HOT" and to which the classification code "HOT" is assigned among all documents to which the classification code "HOT" is assigned, and wherein R_all indicates a percentage of documents which include the one or more keywords selected by the selection circuitry among the plurality of documents;

learning a weight of each keyword selected by the selection circuitry;

recording, in a database, the one or more keywords which are selected in each of the documents to which the one or more classification codes are assigned, wherein the one or more keywords are correlated with the weight of the keyword learned, increasing or decreasing a number of keywords recorded in the database on the basis of the learning; and calculating a score indicating the strength of a connection between an unclassified document to which the one or more classification codes are not assigned and the one or more classification codes, on the basis of the one or more keywords which are included in the unclassified document and the weight correlated with the one or more keywords in the database.

* * * * *